July 10, 1934.  J. B. ARMITAGE  1,966,158
MILLING MACHINE TABLE TRANSMISSION AND CONTROL MECHANISM
Filed Jan. 14, 1932   9 Sheets-Sheet 1

Fig.1

INVENTOR
Joseph B Armitage
BY
Fred G Parsons
ATTORNEY

Fig. 2

July 10, 1934.     J. B. ARMITAGE     1,966,158
MILLING MACHINE TABLE TRANSMISSION AND CONTROL MECHANISM
Filed Jan. 14, 1932     9 Sheets-Sheet 6

INVENTOR
Joseph B Armitage
Fred G Parsons
ATTORNEY

July 10, 1934.  J. B. ARMITAGE  1,966,158
MILLING MACHINE TABLE TRANSMISSION AND CONTROL MECHANISM
Filed Jan. 14, 1932    9 Sheets-Sheet 7

INVENTOR
Joseph B Armitage
Fred G Parsons
ATTORNEY

July 10, 1934.　　　J. B. ARMITAGE　　　1,966,158
MILLING MACHINE TABLE TRANSMISSION AND CONTROL MECHANISM
Filed Jan. 14, 1932　　　9 Sheets-Sheet 8

INVENTOR
Joseph B Armitage
Fred A Parsons
ATTORNEY

Fig.28

Patented July 10, 1934

1,966,158

UNITED STATES PATENT OFFICE 1,966,158

MILLING MACHINE TABLE TRANSMISSION AND CONTROL MECHANISM

Joseph B. Armitage, Wauwatosa, Wis., assignor to Kearney & Trecker Corporation, West Allis, Wis.

Application January 14, 1932, Serial No. 586,561

7 Claims. (Cl. 90—21)

This invention relates to transmission and control mechanism for machine tools, more particularly for milling machines.

An object of the invention is to provide an improved transmission particularly adapted for a relatively large number of rate changes having a relatively large rate variation between the highest and lowest available speeds.

Another object is to provide such a transmission particularly adapted for milling machine feed trains.

A further object is to provide such a transmission having an improved arrangement relative to the driving means or the driven means or both.

A further object is to provide such a transmission having an improved arrangement relative to the structure of a knee and column type of milling machine.

A further object is to provide an improved rate control device for such a transmission.

A further object is to provide an improved drive mechanism for relative bodily movement of the tool and work support of a machine tool including mechanism for feed and quick traverse movements thereof particularly for milling machines and more particularly for knee and column type milling machines.

A further object is to provide improved control devices and an improved relationship therefor for the drive mechanism just mentioned.

A further object is to provide an improved device for the selection of a desired one of the speeds of a multi-speed transmission and an improved arrangement of such a device relative to the transmission and its supporting structure, particularly when the number of available speeds is large and where the transmission is intended for the table movement of a knee and column type of milling machine.

A further object is generally to simplify and improve the construction and operation of machine tools, particularly milling machines and still other objects will be apparent from the specification.

The invention consists of the construction and combinations herein specifically illustrated, described, and claimed, and in such modifications of the structure illustrated and described as may be equivalent to the claims.

The same reference characters refer to the same parts throughout the specification and the accompanying drawings, in which.

Figure 1:
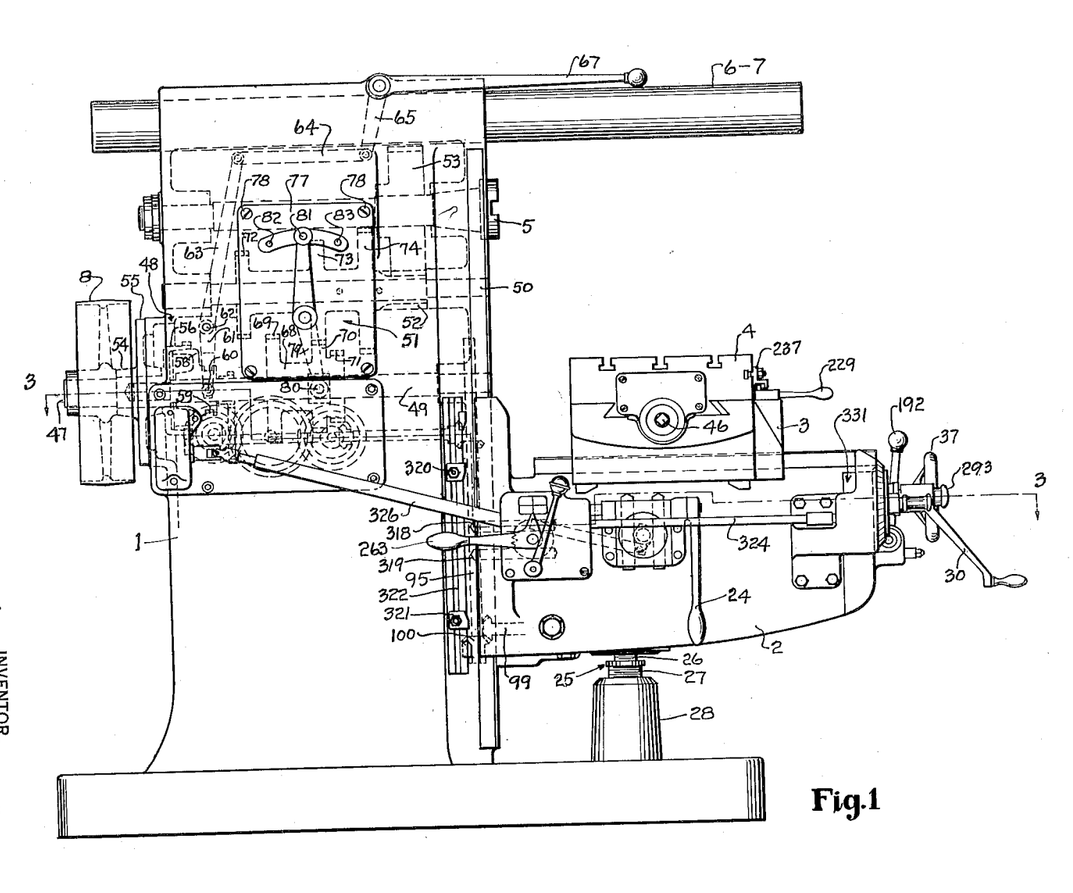
Fig. 1 is a left side elevation of a milling machine illustrative of the invention.

As shown in Fig. 1, the machine illustrative of this invention comprises a column 1 constituting a foundation for the other various parts of the machine. The column carries suitable work supporting members comprising a knee 2 slidable on a front face thereof and a saddle 3 movable toward and from column 1 on suitable guide surfaces of well-known type on knee 2. Saddle 3 carries a table or work support 4 slidably mounted for carrying a work piece into cutting relation with a tool of any suitable type, not shown, driven from a tool spindle 5 rotatively supported in the column. Overarms 6 and 7 are supported in column 1 in any suitable manner for cooperating with a pendant, or the like, or other suitable bracing elements commonly used with machines of this type. The various movable members may be driven by power from any suitable power source, in the present instance represented by a pulley 8, in a manner which will appear below.

Figure 5:
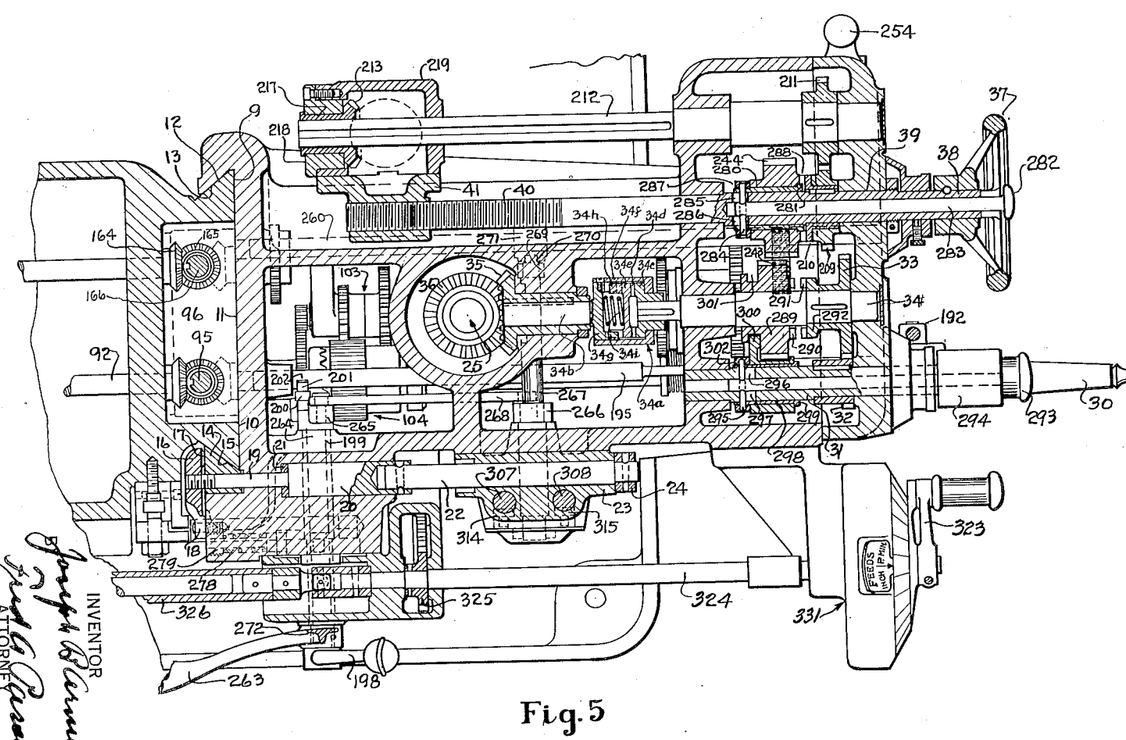
Fig. 5 is a portion of Fig. 3 enlarged.

For guiding knee 2 in its vertical movement, column 1 is provided with front bearing faces 9 and 10, Fig. 5, for sliding engagement with a face 11 on knee 2. An angular surface 12 of column 1 coacts with a complementary surface 13 of knee 2 for maintaining the knee in close engagement with faces 9 and 10. A gib 14 is fitted against an angular surface 15 of column 1 and may be clamped thereagainst by means of a member 16 having a heel 17 at one end contacting the gib member 16 loosely embracing at its opposite end a stud 18 fixed with a portion of knee 2, the stud serving to prevent turning of member 16. Member 16 may be drawn to the right in Fig. 5 by means of a screw 19 journaled in knee 2 and passing through a suitable bore in gib 14 into threaded engagement with a middle portion of member 16. Screw 19 has an enlarged portion 20 fitted in a suitable counterbore in knee 2 and bears against a thrust washer 21 which forms a bearing to receive the end thrust resulting from a tightening of the screw. It will be apparent that such tightening will urge member 16 to the right and engage heel 17 forcibly with gib 14, thereby clamping the gib securely against surface 15 and tightening the various interfitting surfaces against each other to lock knee 2 rigidly with column 1. It will be apparent also that a slight loosening of screw 19 will relieve the clamping action of the parts and allow movement of knee 2 on faces 9 and 10 of column 1. A shaft 22 is suitably coupled with enlarged portion 20 of screw 19, journaled in a member 23 fixed with column 2 and has a hand lever 24 fixed therewith for tightening or loosening the screw when desired.

Figure 28:
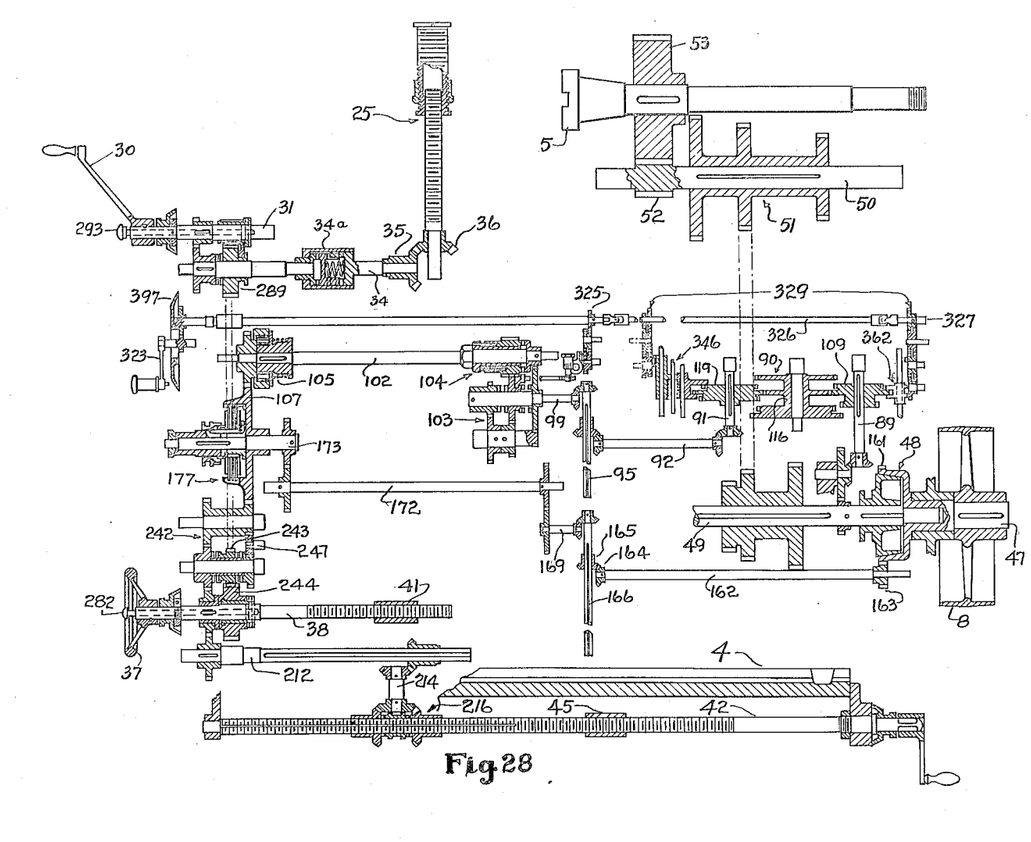
Fig. 28 is a schematic view in the nature of a development indicating the correlation of the parts and operation of the entire machine, the parts in many instances being shown out of their true positions in order to clearly bring out their operative relation.

At such times as gib 14 is loosened, knee 2 may be vertically moved by means of an elevating screw 25, Figs. 1 and 28, which may be of any suitable type, but in the present instance comprises inner and outer members 26 and 27, member 27 engaging a suitable nut in a stump 28 fixed with column 1 and providing an internal thread for coaction with member 26. Member 26 supports the knee through a thrust bearing 29, Fig. 2, of any suitable type, the whole constituting a well-known type of elevating screw for the knee, and forming no part of the present invention. The screw may be turned for raising and lowering knee 2 by means of a hand crank, or the like, 30 fixed with a shaft 31, Fig. 5, and driving, through a gear 32 meshed with a gear 33, a shaft 34, shaft 34 driving screw 25 through a load limiting device generally denoted by numeral 34a fixed with the shaft and driving a shaft portion 34b carrying a bevel gear 35 meshing with a bevel gear 36 fixed with screw member 26.

Saddle 3 may be moved by hand to the left or right in Fig. 1 by operation of a hand wheel 37, Figs. 1 and 28, which, as shown in Fig. 5, is fixed with a shaft 38 journaled in knee 2 and fixed against axial movement therein by means of a bearing 39. Shaft 38 is threaded at 40 and engages a nut portion 41 extended downwardly from saddle 3 adjacent a side portion of knee 2 whereby turning of shaft 38 will cause movement of saddle 3 toward and from column 1, as will be understood.

Figure 2:
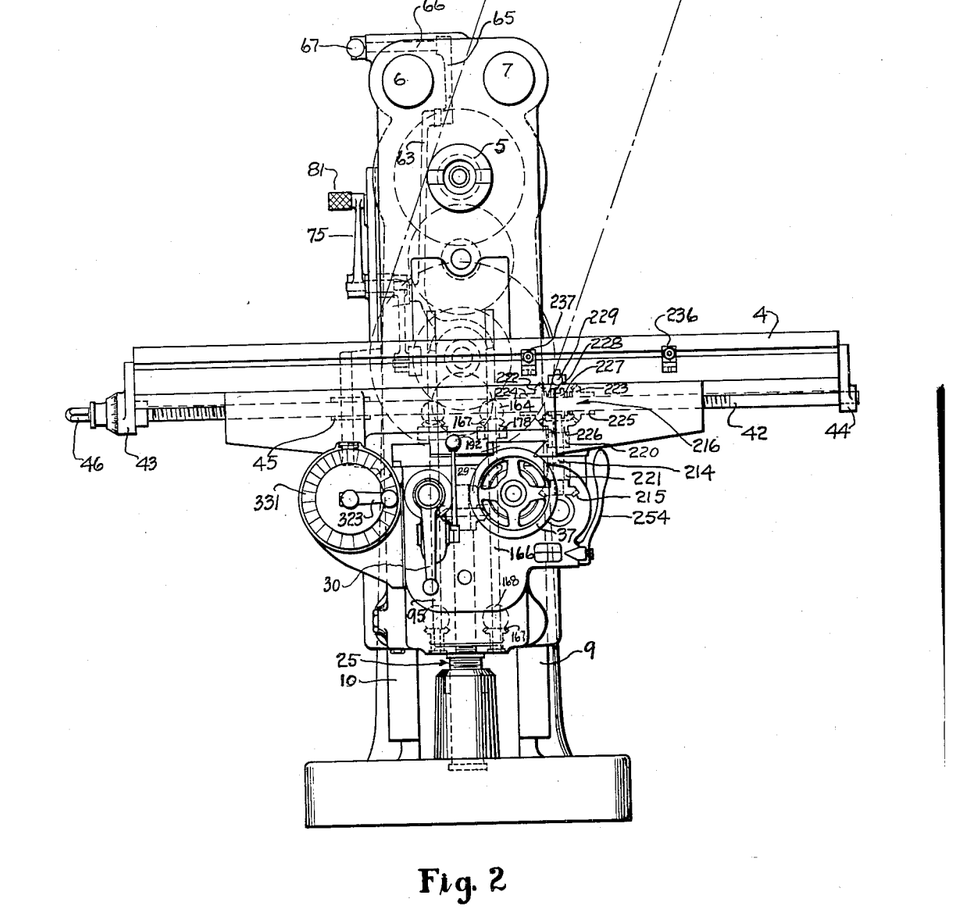
Fig. 2 is a front elevation of the same machine.

For moving table 4 on saddle 3, a table screw 42, Fig. 2, is provided and journaled in bearings 43 and 44 fixed with the table and adapted to prevent axial movement of the screw relatively thereto. The screw engages a suitable nut portion 45 fixed with saddle 3 whereby rotation of the screw will cause longitudinal motion thereof and of table 4. The table screw 42 has a squared portion 46 for the application of a crank, or the like, by means of which the table may be moved by hand when desired.

The various movements of the knee, saddle, and table, just outlined, may all be caused by power from pulley 8, as will become apparent as the specification proceeds.

Referring again to Fig. 1, power movement of spindle 5 is provided as follows: Pulley 8 is fixed with and drives a shaft 47 which drives, through a main clutch generally denoted by numeral 48, Figs. 1 and 28, a shaft 49 suitably journaled in column 1. Shaft 49 drives a shaft 50 through a rate changer generally denoted by numeral 51 and shaft 50 drives, through a gear 52, a gear 53 fixed with spindle 5.

Figures 3, 4:
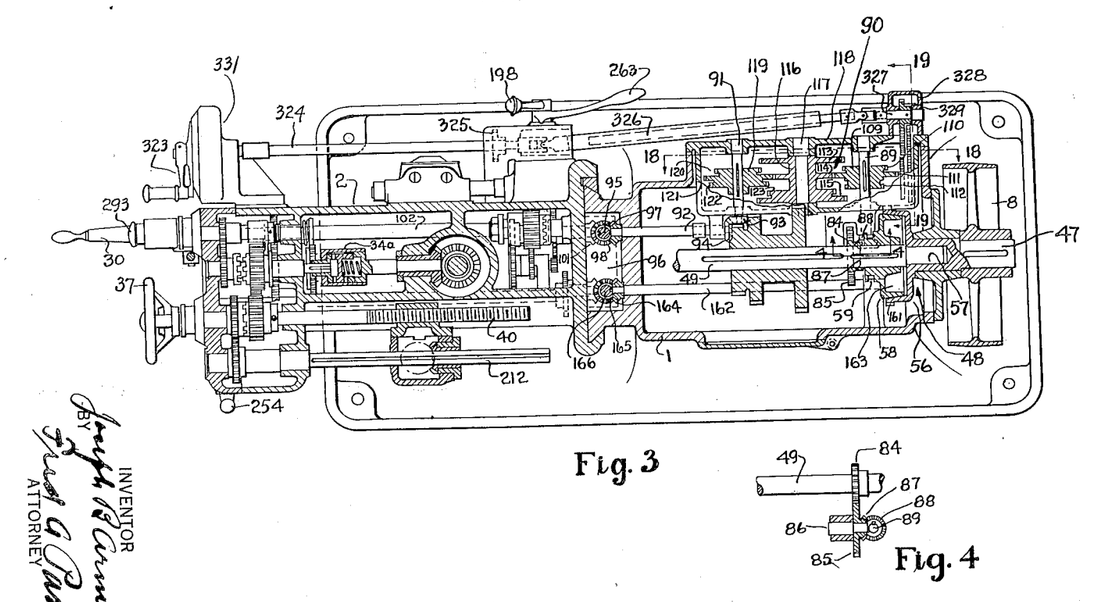
Fig. 3 is a sectional view taken on the line 3—3 of Fig. 1.
Fig. 4 is a vertical sectional view showing certain mechanism indicated in Fig. 3.

Shaft 47 is journaled in a suitable bearing 54 fixed with a cover member 55 removably fixed with column 1 and has fixed therewith a member 56, Fig. 3, forming the outer member of clutch 48. Shaft 47 also has a bore 57 forming a pilot bearing for one end of shaft 49. An inner member 58 is slidably keyed with shaft 49 and has a suitable friction surface for engagement with member 56 when moved to the right in Fig. 3. Accordingly when member 58 is moved to the left, shaft 47 and member 56 may run freely without driving shaft 49, but when member 58 is moved to the right, it will engage member 56 and shaft 49 will be driven.

To provide for such movement, member 58 has an annular groove 59 for engagement through suitable pins 60, or the like, Fig. 1, with a forked end of a lever 61, fixed with a shaft 62 journaled in column 1 and having also fixed therewith a lever 63, lever 63 being connected through a pivoted link 64 with a lever 65 depending between overarms 6 and 7 as shown in Fig. 2 from a shaft 66 journaled in an upper portion of column 1 and having fixed at an outer end thereof a hand lever 67.

Accordingly, as shown in Fig. 1, inner clutch member 58 may be engaged with outer clutch member 56 by upward movement of lever 67, or disengaged by downward movement thereof, as will be understood.

Rate changer 51 comprises a triple gear unit 68 slidably keyed on shaft 49 and consisting of gears 69, 70, 71 adapted for engagement one at a time with gears 72, 73, 74 respectively, fixed with shaft 50, the gears being of different ratios whereby the engagement of one or another pair will result in a series of different speeds in shaft 50 and accordingly in spindle 5. Triple gear member 68 may be shifted along shaft 49 from a hand lever 75 fixed to move with a lever 79 adapted to engage gear 70 by means of a pivoted shoe 80 engaging the sides of gear 70. Movement of lever 75 to the left and right in Fig. 1 will accordingly cause movement of triple gear member 68 respectively to the right and left on shaft 49, causing engaging of one or another of gears 69, 70, and 71 with one of gears 72, 73, and 74, as above noted. A hand grip portion 81 is fixed with a spring pressed plunger of any suitable well-known type slidable in lever 75 and engageable with one or another of holes such as 82 and 83 for holding the parts in position to maintain engagement of one or another of the gear pairs.

A power train for feed movement of the work supporting members is constituted as follows: A gear 84, Fig. 4, fixed with shaft 49 meshes with and drives a gear 85 journaled on a stud 86 suitably fixed with a portion of column 1 and a bevel gear 87 fixed with gear 85 meshes with and drives a bevel gear 88 fixed with a shaft 89 forming a part of a rate changer generally denoted by numeral 90. Figs. 3 and 28. Shaft 89 drives a shaft 91 through the rate changer and shaft 91 drives a shaft 92 through bevel gears 93 and 94 fixed with the respective shafts, the drive continuing to a vertical shaft 95 disposed in a recess 96 formed in column 1 between surfaces 9 and 10 through bevel gears 97 and 98, Fig. 6, fixed with the respective shafts. Shaft 95 is vertically movable with knee 2 and drives a shaft 99 journaled in knee 2 through bevel gears 100 and 101 fixed with the respective shafts and shaft 99 drives a shaft 102, also journaled in knee 2 through a rate changer generally denoted by numeral 103 and a load limiting device generally denoted by numeral 104. Shaft 102 drives, through an overrunning device generally denoted by numeral 105 and a gear 106, Fig. 13, fixed therewith, a gear 107 journaled on a sleeve 108 and forming the terminal element of the feed train.

Rate changer 90, as shown in Fig. 3, comprises a triple gear member 109 slidably keyed on shaft 89 and consisting of gears 110, 111, and 112 adapted to mesh one at a time with gears 113, 114, and 115 respectively, fixed together to form a unitary member 116 journaled on a stud 117 rigidly mounted in a unitary casing 118 removably supported in one side of column 1. Another triple gear unit 119 is slidably keyed on shaft 91 and comprises gears 120, 121, and 122. Gear 120 is of such size and so disposed as to mesh with gear 113 when member 119 is suitably shifted. In another position of member 119, a gear 121 meshes with above mentioned gear 114, and in still another position, gear 122 meshes with a gear 123 fixed with member 116. The engagement of various combinations of these gears will accordingly give a variety of speeds in shaft 91, as will be understood. Means are provided for the shifting of members 109 and 119, as will appear presently.

Figures 6, 7, 8, 9, 10:
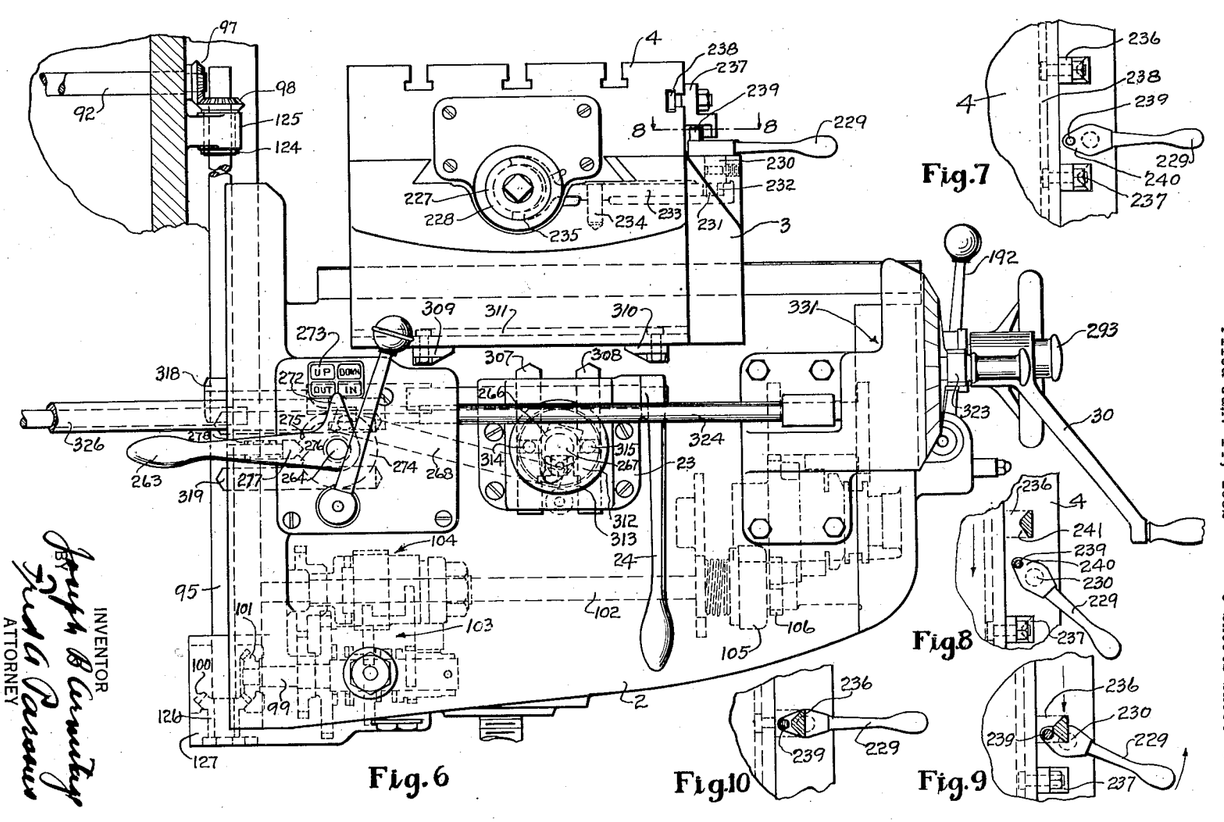
Fig. 6 is a left side view, partly in section, of a front portion of the machine.
Fig. 7 is a plan view of a control mechanism.
Fig. 8 is a sectional view of the same on the line 8—8 of Fig. 6 showing the parts in somewhat different positions.
Figs. 9 and 10 are similar views showing the mechanism in various stages of operation.

As shown in Fig. 6, gear 98 has an elongated hub portion 124 journaled in a bracket 125 fixed with a face of column 1 within recess 96. Hub 124 has a bore therethrough in which shaft 95 is slidably keyed so that the shaft may move vertically through the gear without disturbing the driving relation between it and shaft 92. Shaft 95 at its lower end is fixed with gear 100, the gear having a hub portion 126 journaled in a projecting portion 127 of knee 2 forming a bearing for the gear and a partial housing for the parts.

Figures 11, 12, 13, 14:
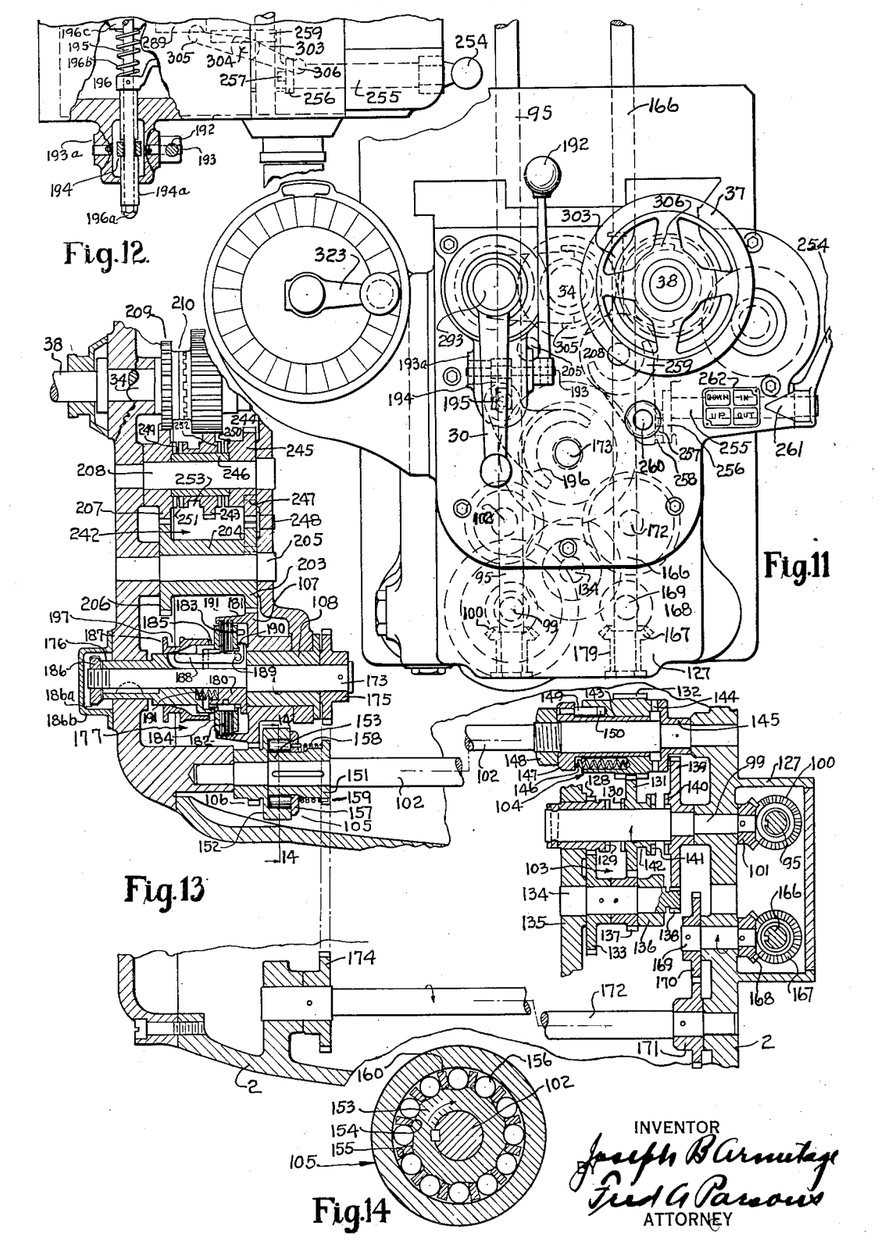
Fig. 11 is a front elevation of a portion of Fig. 2 enlarged.
Fig. 12 is a plan view of a front portion of Fig. 11 partly in section.
Fig. 13 is a development of certain transmission mechanism.
Fig. 14 is a sectional view on the line 14—14 of Fig. 13.

As above described, gear 100 drives gear 101 fixed with a shaft 99. Shaft 99 forms a part of rate changer 103 which is constituted as follows: Turning to Fig. 13, which shows a development of the gear train, shaft 99 has a gear 128 fixed therewith provided with clutch teeth 129 adapted for engagement with clutch teeth 130 fixed with a gear 131 journaled on shaft 99. Gear 131 meshes with a gear 132 forming the driving member of load limiting device 104. Thus when gear 130 is clutched to gear 128, gear 131 is driven from gear 128 and drives gear 132 and, through load limiting device 104, shaft 102. Gear 128 meshes with and drives a gear 133 fixed with a shaft 134 journaled in bearings 135 and 136 fixed with knee 2. Shaft 134 has fixed therewith another gear 137 adapted, under certain conditions, to mesh with gear 131. At such times gear 131 will be disengaged from gear 128 and the drive will be from gear 128 through gears 133 and 137 back to gear 131, which, as above explained, is journaled on shaft 99, gear 131 driving gear 132 which has a sufficiently wide face to prevent disengagement of gear 131 therefrom in its various positions. Shaft 134 also has a gear 138 fixed therewith and meshing with a gear 139 journaled on a portion of shaft 99. Gear 139 is provided with clutch teeth 140 for engagement on occasion with clutch teeth 141 fixed with gear 131. An annular groove 142 is provided between these clutch teeth and the main body portion of gear 131 for readily shifting the same. When gear 131 is shifted to the right, it will engage, through the above mentioned clutch teeth, gear 139 and the drive will then be from gear 128 through gears 133, 138, and 139 to gear 131 and on to shaft 102 through gear 132 as above.

Gear 132 is slidably fitted on a sleeve 143 rotatively mounted on shaft 102 and has angular clutch teeth 144 for engagement with complementary clutch teeth on a clutch member 145 fixed with shaft 102. Gear 132 is urged to the right in Fig. 13 by means of a plurality of springs 146 disposed in suitable bores in gear 132 and bearing against a shoulder portion 147 on sleeve 143. A nut 148 is threaded on shaft 102 and may be tightened against shoulder 147 to move sleeve 143 to the right for adjusting the tension on springs 146. To insure rotation of sleeve 143 on shaft 102, and not rotation of gear 132 on sleeve 143 at such times as movement takes place between gear 132 and clutch 145, pins such as 149 are fixed with shoulder 147 and fit slidably in bores 150 formed in gear 132. Accordingly, at such times as the resistance to rotation of shaft 102 becomes excessively high, gear 132 will be forced slightly to the left by the action of angular clutch teeth 144 against the force of springs 146, gear 132 and sleeve 143 then rotating on shaft 102 and preventing the development of dangerous stresses in any part of the feed train.

Overrunning device 105 comprises a driving member 151 and a driven member 152, member 151 being fixed with shaft 102 and having an elongated cam portion 153 provided with a series of depressions 154, Fig. 14, forming, with a bore 155 in driven member 152, pockets or enclosures for a series of rolls 156. Rolls 156 are spaced by means of a cage 157, Fig. 13, urged in a direction contrary to the rotation of driving member 151 by means of a spiral spring 158 connected at one end with cage 157 and at the other end with a flange 159 fixed with driving member 151. Cage 150

157 is provided with a series of ears 160, Fig. 14, disposed between the rolls and serving to space them equally around cam portion 153 in registration with depressions 154. The ears also serve as a means of communicating the rotative force from spring 158 to rolls 156. The contour of depressions 154 is such that cam portion 153 may drive driven member 152 when rotated in the direction indicated in Fig. 14 through a locking action of the rolls between depressions 154 and bore 155. If, however, driven member 152 be rotated from some other source at a rate higher than that of cam portion 153, rolls 156 will be carried around by contact with bore 155 and will be free to retract into depressions 154 sufficiently to release their grip upon member 152. Spiral spring 158 will normally urge rolls 156 into gripping relation with cam portion 153 and member 152, but it is not sufficiently powerful to interfere with the overrunning action.

It is generally desirable that the quick traverse movements in a milling machine be independent of the movements of the tool spindle and accordingly a quickly traverse transmission in the present machine originates in a gear 161, Figs. 3 and 28, fixed with outer member 56 of clutch 48, which, as above noted, is continuously driven from pulley 8 through shaft 47. Gear 161 drives a shaft 162 through a gear 163 fixed therewith and shaft 162 drives, through bevel gears 164 and 165, a shaft 166 vertically disposed in recess 96 slidably keyed in gear 165 and vertically movable with knee 2. Shaft 166, as more particularly shown in Figs. 11 and 13, drives, through bevel gears 167 and 168, a short shaft 169 journaled in a wall of knee 2 and having on its inner end a gear 170 driving, through another gear 171, a shaft 172 journaled in suitable bearings in knee 2. Shaft 172 drives a shaft 173 through gears 174 and 175 meshed together and fixed with the respective shafts. Shaft 173 is journaled in a bore in sleeve 108 and slidably keyed in a sleeve 176 journaled in a wall of knee 2 and may be caused to drive gear 107 through a clutch generally denoted by numeral 177 forming the terminal of the rapid traverse train.

Gear 167 is journaled in a bracket 178, Fig. 2, fixed with a wall of column 1 whereby it will be maintained in driving relation with gear 164 in spite of movements of shaft 166. Gear 167 has a hub portion 179, Fig. 11, journaled in above mentioned projecting portion 127 of knee 2 (see Fig. 6) forming a bearing for maintaining the shaft 166 in its axial relation with knee 2.

Clutch 177 may be of any suitable type, but in the present instance comprises an inner or driving member 180, Fig. 13, fixed with shaft 173, an outer or driven member 181 fixed with gear 107, and a plurality of friction discs 182, alternate discs being slidably keyed with member 180, and the remainder being slidably keyed with member 181 in any suitable or well-known manner. Thus when discs 182 are compacted, a driving connection will be formed between member 180 and member 181. A compressor plate 183 is slidably keyed to member 180 and may be moved to the left in Fig. 13 to compact discs 182 between itself and a plate 184, also slidably keyed to member 180 and engaging an enlarged portion 185 of above mentioned sleeve 176. Sleeve 176 may be forced to the right for adjusting clutch 177 to compensate for wear of clutch plates 182, etc., by means of a nut or adjustment member 186 threaded on shaft 173, suitable means such as a deformable locking member 186a of well-known type being provided to maintain desired adjustments and a cover plate 186b of suitable type serving to house the nut and protect it from unauthorized manipulation. Plate 183 may be moved as above suggested from a spool or collar 187 slidable on sleeve member 176 and actuating, through suitable cam surfaces, levers 188, of which a plurality may be provided substantially equally spaced around member 180, fulcrumed on pivot pins 189 fixed with the member, member 180 and sleeve 176 having suitable cut-away portions to accommodate the levers. Levers 188 act through their end portions 190 to move plate 183 to the left upon movement of spool 187 to the right. Springs 191 are interposed between sleeve 176 and member 180, continuously urging the sleeve tightly against adjusting nut 186. Thus movement of spool 187 to the right will cause swinging of levers 188, and movement of compressor plate 183 to the left, thus establishing the driving connection between shaft 173 and gear 107, while movement of spool 187 to the left will release the driving connection and gear 107 will accordingly not be driven except through the feed train from shaft 102, through overrunning clutch device 105, and gear 106, shaft 173 and member 180 rotating freely or idly without affecting gear 107. On the other hand, if spool 187 is moved to the right, the discs 182 will be compacted whereupon gear 107 will be driven through member 180, and discs 182, as above explained, for actuating the supports at a rapid traverse rate.

Spool 187 may be moved to the left or right by means of a hand lever 192, Figs. 11 and 12, fixed with a shaft 193 journaled in a housing 193a suitably fixed with knee 2, the shaft carrying a shifter fork 194 fixed therewith and engaging a slot in a sleeve 194a fixed with a shifter rod 195 between a shifter fork 196 and a securing nut 196a of suitable type. Shifter fork 196 is fixed with rod 195 and has a portion extending into engagement with an annular groove 197, Fig. 13, formed in spool 187. Thus movement of lever 192 toward and from knee 2 will cause disengagement and engagement respectively of clutch 177. A spring 196b, Fig. 12, acts between shifter fork 196 and a portion 196c of knee 2 to continuously urge the parts toward disengaged position.

Rod 195 extends backwardly into knee 2 as shown in Fig. 5 and provides for operation of clutch 177 from a second lever 198 at the left side of knee 2. Lever 198 is fixed with a shaft 199 rotatively supported in the knee and having a lever 200, Fig. 25, fixed therewith, the lever carrying a pin 201 engaging a slot 202 formed in rod 195, whereby left and right movements of lever 198, Fig. 5, will cause engagement and disengagement respectively of clutch 177.

It will be apparent that the second lever will often be a convenience when it is desired to move any of the work supports, since the operator, if he finds himself out of reach of one of the levers, will generally be within reach of the other.

The ratios of the various gear trains are such that the rate of movement of shaft 173, Fig. 13, will at all times be higher than the rate of movement of gear 107 resulting from any possible combination of gears in the feed train. Accordingly, when clutch 177 is engaged, as just described, gear 107 and accordingly gear 106 will be driven at a speed in excess of that of shaft 102, in which event overrunning device 105 will release and allow such rapid movement without interference from shaft 102.

The drive continues from gear 107 to the various movable members, a branch going to table 4 as follows: Gear 107, Figs. 13 and 28, meshes with and drives a gear 203 fixed with a sleeve 204 journaled on a stud 205 fixed with knee 2, sleeve 204 driving, through a gear 206 fixed therewith, a gear 207 journaled on a stud 208, gear 207 meshing with and driving a gear 209 journaled as shown in Fig. 5 on the hub portion of a clutch member 210 fixed with above mentioned shaft 38. Gear 209 drives through a gear 211 a shaft 212 journaled in a portion of knee 2, and a bevel gear 213 slidably keyed on shaft 212 drives a vertical shaft 214, Fig. 2, through a bevel gear 215 fixed with the shaft. Shaft 214 drives table screw 42 through a reverser generally denoted by numeral 216, causing longitudinal movement of table 4, as above described for the hand movements of the work supports.

Gear 213, Fig. 5, has a hub portion 217 which is journaled in a closure member 218 fixed in a casing 219 depending from saddle 3, suitable bearings 220 and 221 being provided for shaft 214 as shown in Fig. 2.

Reverser 216 comprises bevel gears 222 and 223, Fig. 2, spaced apart and having suitable bores through which table screw 42 is freely movable, the gears having extended hub portions 224 and 225 respectively, journaled in suitable bearings fixed with saddle 3, the gears being driven in opposite directions by means of a bevel gear 226 fixed with shaft 214. Gears 222 and 223 are provided with clutch teeth adapted for engagement with complementary teeth on a clutch member 227 slidably keyed on table screw 42 between gears 222 and 223 and engageable with one or the other by movement to the left or right in Fig. 2, an annular groove 228 being provided in clutch member 227 for effecting such movement.

Clutch member 227 may be shifted by means of a hand lever 229 fixed with a vertical shaft 230, Fig. 6, rotatable in saddle 3 and having an offset pin 231 fixed with the lower end thereof and engaging a slot 232 in a free end of a lever 233 fulcrumed on a stud 234 fixed with saddle 3. Lever 233 has a forked end portion 235 engaging above mentioned groove 228 whereby swinging of lever 229 will cause sliding of clutch member 227, as will be apparent. The parts are so arranged that table 4 will always travel in the direction in which lever 229 is moved as indicated in Fig. 8.

Table 4 may be caused to stop automatically at any desired point in its stroke by means of adjustable dogs 236 and 237 fixed at suitable points in a T-slot 238 and adapted to contact a pin 239 fixed with an extension 240 of lever 229 and which is moved into the path of the dogs upon swinging of lever 229, as clearly apparent from Figs. 8, 9, and 10. Assuming hand lever 229 to be swung in the direction indicated in Fig. 8, at a predetermined point in table travel, dog 236 will contact pin 239 through a suitable cam surface 241, and turn shaft 230 in a direction to cause disengagement of clutch member 227, thus causing table 4 to stop at a point determined by the placing of dog 236. Obviously an exactly similar course of events may be caused to take place upon movement of table 4 in the opposite direction, dog 237 contacting pin 239 which will have been again moved into the path of the dogs by movement of hand lever 229, as will be understood. Pin 239 is so located as to be sufficiently near table 4 when hand lever 229 is in central or neutral position to allow dogs 236 and 237 to pass without contacting it. This is apparent from Figs. 6 and 10, and allows hand movement of table 4 beyond the points at which the dogs would stop any power movement.

A consideration of Fig. 10 will also show that power movement of the table may be resumed in the same direction after an automatic stop from either direction, since the dog, as clearly shown in this view, does not interfere with swinging of the lever in either direction, and also that, whichever direction the lever is swung, the resulting movement of the table will carry the dog away from pin 239 without effecting any movement of the lever.

The power drive from gear 107 to saddle 3 is as follows: Gears 203 and 206, Fig. 13, driven from gear 107, as above described constitute part of a reverser generally denoted by numeral 242 terminating in a gear 243 meshing with and driving a gear 244 which, as shown in Fig. 5, may be clutched to shaft 38 whereby the shaft may be driven in one or the other direction according to the direction of drive resulting from reverser 242. Referring again to Fig. 13, reverser 242 comprises gear 207 and a gear 245 spaced apart on stud 208 by means of a sleeve 246, gear 207 being driven from gear 206, as above described, and gear 245 being driven in the opposite direction to gear 207 from gear 203 through an idler gear 247 journaled on a stud 248, gears 207 and 245 having clutch teeth 249 and 250 respectively. Gear 243 is journaled on sleeve 246 and is also slidable thereon for engagement with either gear 207 or gear 245 by means of clutch teeth 251 and 252 fixed with the gear, an annular groove 253 being provided for such shifting. The face of gear 244 is sufficiently wide to permit considerable axial displacement of itself and gear 243 without disengagement therefrom.

Gear 243 may be shifted on sleeve 246 by means of a hand lever 254, Figs. 11 and 12, fixed with a shaft 255 journaled in knee 2 having a lever 256 fixed with the inner end thereof carrying a pin 257 engaging a suitable groove 258 in a shifter fork 259 fixed with a rod 260 which is axially slidable in knee 2. Fork 259 engages groove 253, Fig. 13, whereby swinging of lever 254 will cause shifting of gear 243 into engagement with one or the other of gears 207 and 245. Lever 254 carries an index 261 indicating against a chart 262 the direction of travel resulting from the positions of lever 254.

Figures 24, 25, 26, 27:
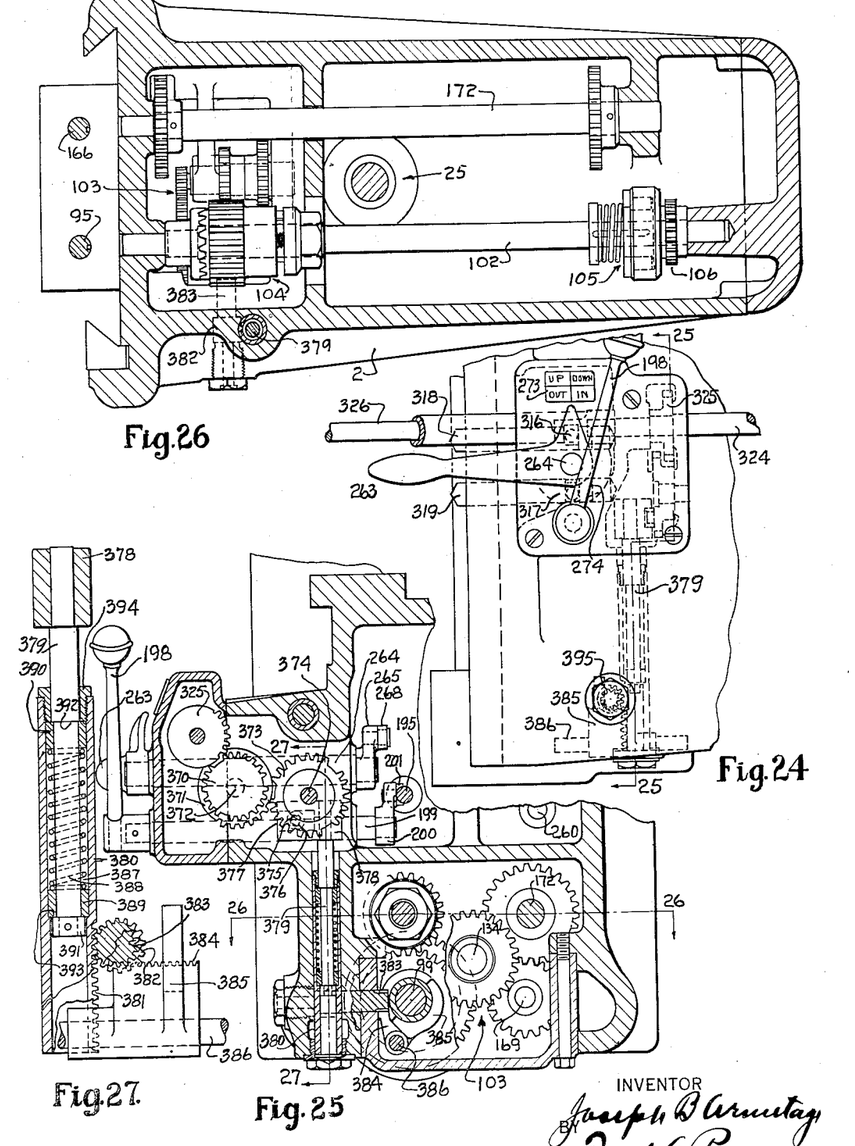
Fig. 24 is an enlarged elevation of a portion of Fig. 1, showing certain mechanism in more detail.
Fig. 25 is a sectional view on the line 25—25 of Fig. 24.
Fig. 26 is a sectional view on the line 26—26 of Fig. 25.
Fig. 27 is an enlarged sectional view of a shifter device indicated in Fig. 25, taken along line 27—27 of Fig. 25.

Rod 260 extends backwardly into knee 2, as shown in Fig. 5, and may be operated from a hand lever 263 at the left side of knee 2, the lever being fixed on a shaft 264, Fig. 25, journaled in the knee and having a lever 265 fixed on the inner end thereof. Lever 265 actuates a lever 266, Figs. 5 and 6, fixed with a shaft 267 through a link 268 pivoted to the respective levers whereby rotation of shaft 264 in one direction will cause rotation of shaft 267 in the opposite direction. Turning again to Fig. 5, shaft 267 has a lever 269 on an end thereof carrying a pin 270 engaging a suitable groove in a member 271 fixed with shaft 260. Rotative movement of shaft 267 caused from movement of lever 263 will accordingly cause axial movement of rod 260 and shifting of gear 243. The gear and therefore the direction of movement of the parts driven therefrom may accordingly be controlled from two separate positions on the knee with the obvious advantages. An index 272, Fig. 6, is fixed with lever 263 and indicates against a chart 273 the direction of movement to be expected from movement of the lever. A cam 274 is fixed with shaft 264 and has suitable notches such as 275 and 276 for the reception of the end portion of a detent 277 pressed thereagainst by a spring 278, Fig. 5, retained in a suitable bore in knee 2 by means of a bushing 279, the detent serving to hold the various parts in position for movement through reverser 242, Fig. 13, in one or the other direction, or to hold the parts in neutral.

Gear 244 is journaled on a sleeve 280 slidably fitted on shaft 38 and having a shoulder 281 adapted to prevent endwise movement of gear 244 relative to sleeve 280 in one direction. The sleeve may be moved axially on shaft 38 from a manually operable element 282 fixed with a rod 283 slidable in a suitable bore formed axially in shaft 38 and connected with sleeve 280 by means of a pin 284 movable in slots 285 and 286 formed in shaft 38. The pin engages a collar 287 fitted on sleeve 280 and preventing axial movement of gear 244 relative to sleeve 280 in the other direction. Gear 244 has clutch teeth 288 for engagement with complementary teeth formed on clutch member 210 above described. Accordingly, whenever gear 244 is moved to the right in Fig. 5 and gear 243 (Fig. 13) is engaged with one or the other of gears 207 and 245, shaft 38 will be driven by power from gear 244 through clutch 210.

It is to be noted at this point that gear 244 has a greater number of teeth than gear 243, the purpose being to cause a slower rate of rotation of screw shaft 38 than that of table screw 42 and accordingly a slower rate of rapid traverse of saddle 3 than of table 4.

For power movement of knee 2, gear 243, the above described terminal element of reverser 242, drives a gear 289, Figs. 5 and 28, slidably journaled on shaft 34 and engageable through clutch teeth 290 with complementary clutch teeth 291 on a clutch member 292 fixed with shaft 34, the clutch being of any suitable type, but in the present instance formed integrally with above mentioned gear 33. Movement of shaft 34 in one or the other direction as determined by reverser 242 will cause raising or lowering of the knee as outlined for the hand movement thereof.

Gear 289 may be shifted into and out of engagement with clutch 292 by means of a manually operable element 293 fixed with a rod 294 movable axially in a suitable bore in shaft 31 and connected by means of a pin 295 slidable in slots 296 and 297 formed in shaft 31 with a bushing 298 slidable thereon and having a shoulder 299 adapted to prevent endwise movement in one direction relative to bushing 298 of a shifter fork 300 journaled on the bushing and engaging an annular groove 301 in gear 289, bushing 298 having a collar 302 fixed therewith to prevent such movement in the other direction. Thus movement of element 293 to the right or left in Fig. 5 will cause corresponding movement of bushing 298, fork 300, and gear 289, causing engagement or disengagement thereof with clutch 292.

In order to provide a slower rate of rapid traverse of knee 2 than of table 4, gear 289 is made with a greater number of teeth than gear 243 with which it meshes, whereby to produce a slower rate of rotation of shaft 34 than that of table screw 42.

Load limiting device 34a, as shown in Fig. 5, comprises a clutch member 34c fixed with shaft 34 and having angular clutch teeth 34d engaging complementary teeth on a clutch member 34e, movably retained in a housing 34f fixed with a portion 34g of shaft portion 34b and journaled on clutch member 34c. Clutch member 34e is rotatively fixed with shaft portion 34g by means of interengaging lugs or tongues 34h shaped to permit relative axial movement therebetween, and member 34e is continuously urged to the right in Fig. 5 by means of a spring 34i into engagement with clutch member 34c for transmitting the drive from shaft 34 to shaft portion 34b. A positive drive is therefore furnished between shaft 34 and elevating screw 25 during all normal loads, but in the event of an excessive torque being developed in shaft 34, clutch member 34e will be forced to the left by reason of the particular shape of teeth 34d against the resistance of spring 34i, clutch member 34c then rotating relative to clutch member 34e, housing 34f, and shaft portion 34b, and preventing the development of dangerous stresses in any of the connected parts.

It is generally undesirable to permit simultaneous power movement of both the knee and saddle of a milling machine. To obviate the possibility of such movement in the present machine means are provided for preventing the simultaneous engagement of gears 244 and 289 with clutches 210 and 292 respectively. As shown in Figs. 11 and 12, the means comprise a lever 303 pivoted on a stud 304 and having forked end portions 305 and 306 engaging respectively the front faces of gears 289 and 244 so that engagement of the one will automatically cause disengagement of the other. The parts are so proportioned and arranged that there is no possible condition in which both the gears can be engaged with their respective clutches at the same time. However, since lever 303 acts upon the front faces of the gears only, it does not prevent the disengagement of either gear at any time. Accordingly both gears may be placed in disengaged position and left there during such times as it is not desired to move either knee 2 or saddle 3 by power, but when such power movement is desired, it is merely necessary to move element 282 or 293 to the right in Fig. 5 according to whether it is desired to move saddle 3 or knee 2, and then engage the gears in reverser 242 for the direction desired by means of either of levers 254 or 263. The desired member will then move at a feed rate if the feed train is running or at a rapid traverse rate if, through the operation of either of levers 192 or 198, clutch 177 is engaged.

Provision is made for automatically stopping the movement of saddle 3 at any desired point in the form of plungers 307 and 308, Fig. 6, vertically slidable in member 23, and adapted to be depressed by dogs 309 and 310, adjustably fixed with saddle 3 by means of a T-slot 311. Plungers 307 and 308 are connected to actuate shaft 267 by means of a plate 312 fixed with the shaft in a suitable recess in member 23 covered by a closure plate 313. Plate 313 carries a pair of pivoted shoes 314 and 315, more particularly shown in Fig. 5, engaging suitable slots in plungers 307 and 308, so that turning of shaft 267 will cause raising of one plunger and lowering of the other and also that depressing of one plunger will cause turning of the shaft and raising of the other plunger.

Movement of lever 263, Fig. 6, in an upward direction will engage detent 277 with notch 276, turning shaft 264 in a clockwise direction and, through link 268, turning shaft 267 in a counter-clockwise direction, raising plunger 308 and depressing plunger 307. Such movement of shaft 267 will cause movement of rod 260, Fig. 5, to the right, shifting gear 243, Fig. 13, into engagement with gear 207 through clutch teeth 251 and 249. This will result in movement of saddle 3 to the left in Fig. 6. At a desired point in the travel of the saddle, dog 310 will contact plunger 308 and depress the same, causing clockwise rotation of shaft 267 and returning lever 263 to the position shown. Such rotation of shaft 267 will cause movement of rod 260 to the left in Fig. 5, moving gear 243 to the left into the position shown in Fig. 13, and by disengaging clutch teeth 251 from clutch teeth 249 on gear 207, interrupting the power drive and stopping the movement of the saddle. Movement of lever 263, Fig. 6, in a downward direction will engage detent 277 with notch 275, turning shaft 264 in a counterclockwise direction and, through link 268, turning shaft 267 in a clockwise direction, raising plunger 307 and lowering plunger 308. Such movement of shaft 267 will cause movement of rod 260, Fig. 5, to the left, shifting gear 243, Fig. 13, into engagement with gear 245 through clutch teeth 252 and 250. This will result in movement of saddle 3 to the right in Fig. 5, the movement continuing until dog 309 contacts and depresses plunger 307 when the reverse movement of the above enumerated parts will take place and gear 243 will be shifted out of engagement with gear 245 and the movement of saddle 3 will stop as above.

The power movement of knee 2 may be automatically stopped through similar mechanism as follows: Referring to Fig. 24, cam member 274 carries pivoted shoes 316 and 317 engaging suitable slots in plungers 318 and 319 horizontally slidable in knee 2 and projecting therefrom under certain conditions into the path of dogs 320 and 321, Fig. 1, adjustably fixed with column 1 by suitable means such as T-slot 322. Thus upward movement of lever 263 will cause clockwise rotation of shaft 264, movement of plunger 319 to the left so as to project from knee 2, and of plunger 318 to the right into the knee. Through above described connections to reverser 242 such movement of lever 263 will cause downward movement of knee 2, provided gear 289 is engaged with clutch 292, Fig. 5, the parts being maintained in such position by engagement of detent 277, Fig. 6, with notch 276 of cam 274. At a predetermined point in such movement of knee 2 plunger 319 will contact dog 321, Fig. 1, and continued movement of knee 2 will cause the plunger to be forced to the right, causing counterclockwise rotation of shaft 264, returning lever 263 to the neutral position shown in Fig. 1 and disengaging the gears of reverser 242. The movement of knee 2 will accordingly stop and upward movement may be initiated by a downward movement of lever 263 and stopped by dog 320 acting upon plunger 318 in a similar manner.

It is to be noted that dogs 320 and 321 are so positioned as to clear plungers 318 and 319 when the latter are in the position shown in Fig. 1. It is thus possible to move the knee by hand beyond the limits predetermined by the dogs for power movement, since such hand movement does not depend upon a connection through reverser 242 but merely upon a drive from shaft 31, Fig. 5, through gears 32 and 33 to shaft 34, as above explained, and may accordingly be obtained when reverser 242 is in neutral, as will be understood.

The shiftable elements in rate changers 90 and 103 are arranged to be controlled from a single lever or crank 323, Fig. 3, the lever driving through suitable reduction gears, a shaft 324 rotatively supported from the knee and adapted to cause shifting of the rate change elements of rate changer 103 through suitable mechanism driven from a gear 325. Shaft 324 connects through an extensible universal joint shaft 326 of well-known type with a shaft 327 journaled in a casing 328 fixed with casing 118. Shaft 327 causes through suitable mechanism including a gear 329 shifting of the rate change elements in rate changer 90.

It should be noted that gear 329 appears in two places in Fig. 28 as do the gears operating shifter 346. This is done merely to make clear the operation of these parts in a single view. Reference to Figs. 18, 19, and 21—23 will give the actual construction at this point.

Figures 15, 16, 17, 23:
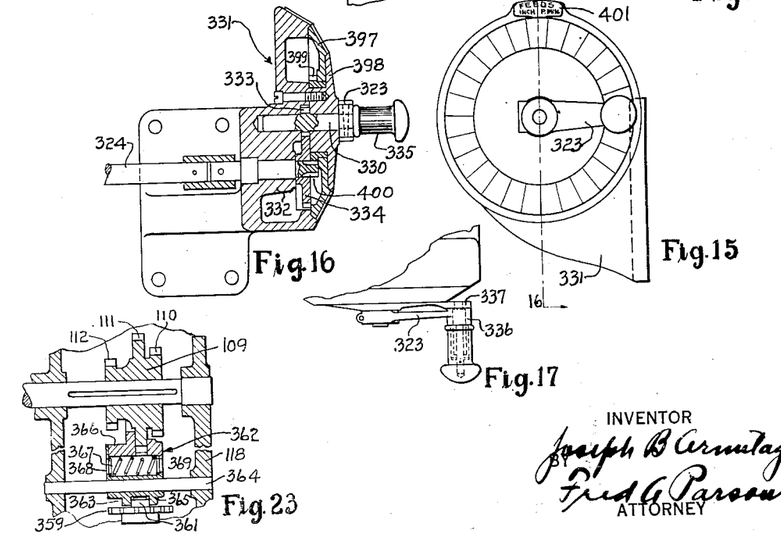
Fig. 15 is an enlarged front view of a control device shown in Fig. 2.
Fig. 16 is a sectional view on the line 16—16 of Fig. 15.
Fig. 17 is a plan view of a portion of the device shown in Fig. 15.
Fig. 23 is a similar view showing other shifting mechanism.

As shown in Fig. 16, lever 323 is fixed with a shaft 330 journaled in a head member generally denoted by numeral 331 fixed with knee 2 and providing a bearing 332 for the front end of shaft 324. Shaft 330 drives shaft 324 through a gear 333 meshing with a gear 334, the gears being fixed with the respective shafts. Gears 333 and 334 are in the present instance so constituted that shaft 324 will make one revolution for every three revolutions of shaft 330, although any other convenient ratio might be used equally well, the one chosen giving the result that each complete turn of lever 323 will produce a new speed in the feed train, all of which will be clearly apparent below. Lever 323 is provided with a grip portion 335 connected with a spring pressed pin or plunger 336, Fig. 17, adapted to engage a suitable detent hole in an arm 337 fixed with head 331 for locking lever 323 in a certain position.

Figures 18, 19, 20, 21, 22:
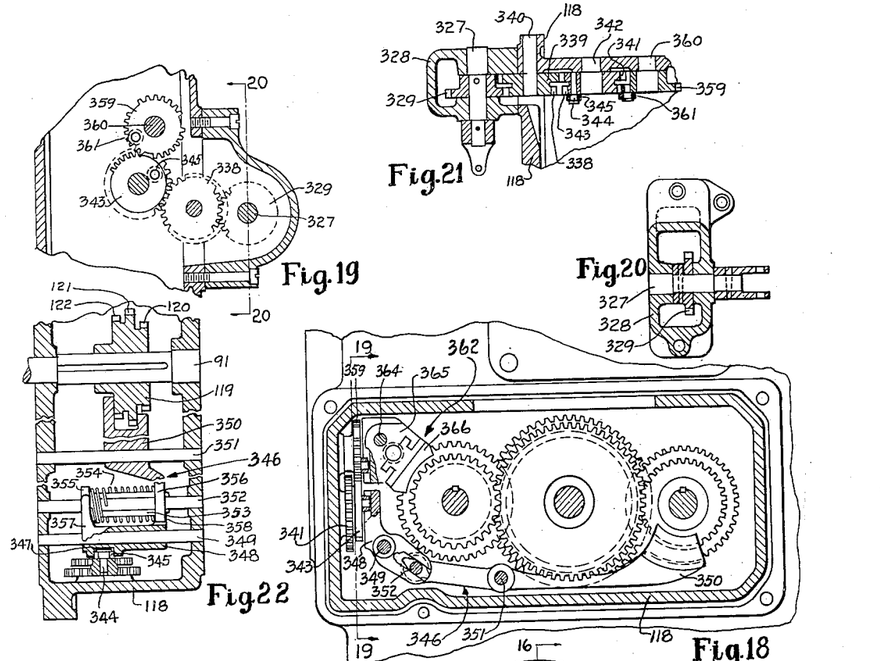
Fig. 18 is a sectional view on the line 18—18 of Fig. 3 showing the interior of a transmission housing.
Fig. 19 is a sectional view on the line 19—19 of Fig. 18.
Fig. 20 is a sectional view on the line 20—20 of Fig. 19.
Fig. 21 is a development of the gearing shown in Fig. 19.
Fig. 22 is a development of certain shifting mechanism indicated in Fig. 18.

The operation of the shifting mechanism is as follows:

Proceeding first to rate changer 90 above mentioned, gear 329, see Figs. 19 and 21, meshes with and drives a gear 338, gear 338 being fixed with a gear 339 and journaled on a stud 340 fixed with a part of casing 118. Gear 339 meshes with and drives a gear 341 journaled on a stud 342 also fixed with casing 118, an intermittent or mutilated gear 343 being fixed with gear 341 and the gears being provided with a pin 344 carrying a roller or shoe 345. Shoe 345 actuates a shifter device generally denoted by numeral 346 in Figs. 18 and 22, engaging a slot 347 in a member 348 constituting a part of the shifter and slidable on a rod 349 fixed in casing 118. A second member 350 is slidable on rods 351 and 352 fixed in casing 118 and engages at one end the slides of above mentioned gears 121 and 122, constituting a part of member 119 and at its other end having a sleeve portion 353 slidably fitting rod 352. A spring 354 is disposed upon sleeve portion 353 and engages at its ends enlarged projecting portions 355 and 356 of sleeve 353. Member 348 has forked portions 357 and 358 embracing respectively portions 355 and 356 of sleeve 353 and also engaging the ends of spring 354 at points unoccupied by enlarged portions 355 and 356. Accordingly member 350 will be caused by spring 354 to follow movements of member 348 so long as no resistance to movement of member 350 is encountered, but in the event that such resistance does arise, as would occur if the gears were not in position to mesh, member 348 will nevertheless be permitted to move, one of the fork members 357 and 358 serving to further compress spring 354 and exert upon member 350 through spring 354 acting against one of portions 355 and 356 a tendency for member 350 to move in the desired direction. If now such resistance to movement of member 350 be removed, as, for example, by slight rotation of one of the gear members which it is desired to engage, spring 354 will immediately act to move member 350 and gear member 119 sufficiently to restore the relation between the members shown in Fig. 22, shifting member 119 into the desired position.

Referring to Fig. 3, it will be noted that member 119 has three possible engaged positions with gear member 116. It is also true, as explained above, that shaft 327 makes one-third of a revolution for each full revolution of lever 323. Since gears 329 and 338, Fig. 21, are of equal size, as are gears 339 and 341, the fractional revolutions of shaft 327 will operate to produce three definite separate positions of shoe 345 occurring in sequence upon consecutive revolutions of lever 323, and it will be apparent that the consecutive movements of shoe 345 will operate to shift member 346 and gear member 119 from one of its engaged positions to another upon each successive turn of lever 323, the series being repeated so long as lever 323 is rotated. It will be understood that gear 119 may often resist such shifting through abutment of the ends of teeth of one or another of gears 120, 121, or 122 with those of their mating gears, and in this event movement of the whole train of shifting mechanism would be blocked unless provision were made to rotate one or another of the gear members out of such blocking position, but the provision of spring 354 obviates this possibility, since in such a situation the spring will be compressed, permitting movement of member 348 to the desired position, member 350 being shifted by the spring to the corresponding position as soon as the gears have been moved into suitable meshing relation. Thus for any given speed of gear member 116, Fig. 3, three different speeds may be produced in shaft 91 by merely rotating lever 323, each successive revolution of the lever shifting gear member 119 to a new position.

Mechanism is provided for shifting the gear member 109 into a new position upon completion of each three positions of gear member 119 whereby to give a total of nine different speeds in rate changer 90 as follows: Mutilated gear 343, Fig. 21, engages a complementary gear 359, journaled on a suitable stud 360 fixed with casing 118, the gears being provided with teeth and spaces such that one-third of a revolution of gear 343 will advance gear 359 one-third of a revolution, gear 359 remaining stationary during the remaining two-thirds of each revolution of gear 343. Thus it will take three revolutions of gear 343 or nine revolutions of lever 323 to produce a full revolution of gear 359. The fractional revolutions of gear 359 result in three definite separate positions of a shoe or like member 361 pivoted on a suitable pin fixed with gear 359 as shown. It will accordingly be apparent that every third revolution of lever 323 will produce a change in position of shoe 361 but that the remaining revolutions of lever 323 will not affect shoe 361 but merely shoe 345 on gear 343.

Shoe 361 acts to shift gear member 109 through a shifter member generally denoted by numeral 362, Figs. 18 and 23, the shoe acting in a suitable slot 363 in the member to cause sliding movement thereof on a rod 364 fixed in casing 118.

The three positions of shoe 361 define three positions of gear member 109 in one of which gear 110 will engage gear 113, Fig. 3, and in another of which gear 111 will engage gear 114 and in the other of which gear 112 will engage gear 115, thus giving three changes of rate between shaft 89 and member 116. Since through shifting of member 119 there are available three different rates in shaft 91 for each rate in member 116, the complete rate changer 90 gives a total of nine changes of rate between shafts 91 and 89, all available upon successive turns of lever 323. In order to guard against blocking of shifter 332, Fig. 23 such as outlined above for shifter 346, shifter 362 comprises separate members 365 and 366, Fig. 23, slidably keyed together as shown in Fig. 18 whereby the members are free to move longitudinally relative to each other but are otherwise locked together, as will be understood. Member 365 is slidable on rod 364 and member 366 is slotted to engage gear 111. Members 365 and 366 are resiliently restrained against relative longitudinal movement by means of a spring 367 disposed in a suitable recess formed between the members, half in member 365 and half in member 366, the spring engaging at its ends both members by means of suitable shoulders such as 368 and 369 formed on the members and defining the ends of the recess as clearly shown in Fig. 23, whereby mutual displacement of the members in either direction will result in compressing the spring, and the continuous tendency of the spring to expand will tend at all times to maintain the members in the relation shown in the figure. In the event that any of the gears on member 109 are not in proper position to engage with gears on member 116 upon movement of shoe 361, member 365 may move without moving member 366 and compress spring 367, but immediately upon rotation of either gear member, so that the gears are in position to mesh, spring 367 will expand, moving member 366 and shifting the gears into the desired speed.

The ratios of the various gear pairs and the relative positions of shoes 345 and 361 are such that, starting with the lowest speed at which shaft 91 may be driven, consecutive revolutions of lever 323 will produce consecutively increasing speeds in shaft 91 throughout the range of rate changer 90, the ninth turn of lever 323 returning the apparatus to the condition for the lowest speed, and further turns repeating the cycle of successively increasing speeds.

Further rate changes are available through rate changer 103 which is also automatically shifted from lever 323 in definite relation with rate changer 90. Above mentioned gear 325, see Fig. 25, is of the mutilated type and engages a gear 370, the gears having teeth and spaces such that one-third of a revolution of gear 325 will advance gear 370 one-third of a revolution, during the remaining two-thirds of a revolution of gear 325, gear 370 remaining stationary. Gear 370 is fixed with a gear 371 journaled on a stud 372, gear 371 being of the mutilated type and engaging a complementary gear 373 journaled on a stud 374, the gears having teeth and spaces such that a one-third revolution of gear 371 will advance gear 373 one-third of a revolution, the latter gear remaining stationary during the remaining two-thirds of each revolution of gear 371. Gear 373 will accordingly make one-third of a revolution for every three complete turns of gear 325, or accordingly for every nine complete turns of lever 323.

The fractional revolutions of gear 373 will result in three definite distinct positions of a shoe 375 pivoted on a suitable stud 376 fixed with the gear. The positions of shoe 375 correspond to the shifted positions of gear 131, Fig. 13, and means are provided as follows for shifting gear 131 in accordance with the positions of shoe 375. Shoe 375, Fig. 25, engages a slot 377 in a member 378 fixed with a rod 379 vertically movable in knee 2 and actuating a sleeve 380 having rack teeth 381, Fig. 27, engaging a pinion member 382, Figs. 27 and 26, journaled in the knee. Pinion member 382 has an extending portion 383, Fig. 25, having suitable teeth engaging a rack 384 fixed with a shifter fork 385 slidable on a rod 386 fixed with the knee. Fork 385 engages groove 142, Fig. 13, in gear member 131 whereby vertical movement of rod 379 will cause shifting of gear 131.

To prevent blocking of the mechanism through failure of gear 131 to engage, a certain amount of resiliency is provided between rod 379 and sleeve 380. Sleeve 380, Fig. 27, extends upwardly along rod 379 and has a space 387 in which is a spring 388 slidable on rod 379 and engaging at its ends slidable collars 389 and 390. Collars 389 and 390 bear respectively against a collar 391 and a shoulder 392 on rod 379, and are pressed thereagainst by spring 388. Sleeve 380 has an internal shoulder 393 engaging slidable collar 389 and also a bushing 394 engaging collar 390. Except for such engagement with collars 389 and 390, sleeve 380 is longitudinally slidable on shaft 379. Accordingly if resistance to movement of pinion 382 is encountered, rod 379 may move nevertheless, for example, downwardly in Fig. 27, carrying with it collar 390 and compressing spring 388, collar 389 remaining stationary against shoulder 393. As soon as sleeve 380 is free to move, spring 388 will expand and move collar 389 and sleeve 380 to restore the relation between the parts shown in the figure, thereby shifting gear 131 into the desired position. In like manner if resistance is encountered to movement of sleeve 380 upwardly, collar 389 will be moved with rod 379 through engagement with collar 391, and spring 388 will again be compressed, the parts moving as above as soon as gear 131 is free to move. Suitable closure members 395 and 396, Fig. 25, are provided for access to pinion 383 and rod 379.

As above outlined, shoe 375 will change its position once for every nine complete turns of lever 323 and, as has been explained, each turn of lever 323 results in a change of rate in rate changer 90 and accordingly in the driving shaft 99 of rate changer 103, Fig. 13. The ninth turn, however, while it returns the elements of rate changer 90 to positions to start to repeat its cycle of nine speeds, causes also a movement of gear 373 and shifting of gear 131 into a new position, giving rise to a change of rate in rate changer 103. The effect in driven shaft 102, and accordingly in any of the members moving at a feed rate will thus be to produce a new series of nine speeds different from the first, a new speed again resulting from each successive turn of lever 323. At the completion of this new series of nine speeds, gear 373 will again move, shifting gear 131 into a third position and giving a third series of nine speeds. As above outlined for rate changer 90, the ratios of the gears in rate changer 103 and the three positions of shoe 375 are so chosen that the whole series of speeds from the lowest to the highest at which it is possible to drive shaft 102 will take place in consecutive increasing increments following in regular order, one at each successive turn of lever 323.

After the highest possible speed is reached, a further turn of lever 323 will shift all the shiftable elements back to their lowest speed positions and the whole series of twenty-seven speeds will be started over again. It is thus possible to obtain any of the speeds of which the complete rate change mechanism is capable simply by giving lever 323 the requisite number of turns. Obviously, turning the lever in one direction will result in successively increasing speeds, while turning it in the other direction will result in successively decreasing speeds. It is, therefore, possible when a new speed is desired to turn the lever in whichever direction will cause such speed to be reached with the smaller number of turns.

Means are provided for indicating the speed to be expected from any given operation of lever 323 in the form of a chart member 397, Figs. 16 and 28, journaled on the hub portion of a stationary plate 398 and having a gear 399 fixed therewith meshing with a gear 400 fixed with shaft 324. Member 397 will accordingly rotate whenever shaft 324 is driven from rotation of lever 323 and the ratios of the gears are so chosen that dial 397 will make one complete revolution during the shifting of all 27 available speeds in the rate change apparatus. Suitable indicia may be applied to chart member 397 reading directly in inches per minute or any other suitable designation of speeds, and an index 401, Fig. 15, of any suitable type may cooperate with the chart to point out which of the indicated speeds is effective.

It will thus be apparent that out of a total of 27 possible speeds any desired speed may be selected and produced merely by rotating lever 323 until the desired speed appears under index 401, and the rotation may take place in either direction, whichever will give the shortest movement to the desired speed, as explained above.

Although the mechanism disclosed is adapted to produce a maximum of 27 speeds, it should be understood that the principles and apparatus involved could with slight modification be adapted to rate changers giving a different number of speeds within the scope of this phase of the invention, it being necessary in the description to illustrate the specific arrangement shown in the interests of clarity merely.

The above being a complete description of an illustrative embodiment of the invention, what is claimed is:

1. In a milling machine, the combination of an upstanding column, a tool spindle rotatably supported from said column, a work table supported from said column for bodily reciprocatory movement in a plurality of paths, a transmission for rotation of said spindle including a spindle rate changer, a power train for moving said table driven from said transmission to exclude said spindle rate changer, said power train including a first group of shiftable rate change elements associated with said column in bodily fixed relationship with said spindle, a second group of shiftable rate change elements bodily movable with said table in one of said paths, and a reversing device, said groups being connected through transmission mechanism adapted to permit relative bodily movement between said groups, and control means for said power train including adjustable means in fixed bodily relation to one of said groups, motion transmitting connections controlled from the adjustment of said adjustable means and operable for the shifting of elements of each of said groups, and other means independently operable for control of said reversing device.

2. In a milling machine, the combination of an upstanding column having a front wall, a tool spindle rotatably supported from said column, a knee supported from said column and guided thereon for vertical movement, a work table supported from said knee for reciprocatory movement relative thereto in a direction transverse to the axis of said spindle, a power train for rotating said spindle including a power source associated with said column, transmission mechanism for said table including a feed train and a rapid traverse train each driven from said power source, said column providing guide surfaces for said vertical knee movement including surfaces associated with said front wall and spaced apart in the direction of table movement, said table transmission including a plurality of extensible shaft devices each including a vertical shaft element positioned closely adjacent said front column wall and between said spaced apart guide surfaces, one of said shaft elements being a portion of said feed train and another of said shaft elements being a portion of said rapid traverse train, and control mechanism for connecting said table to be alternatively driven from the one or the other of said shaft elements.

3. In a milling machine, the combination of an upstanding column having a front wall, a tool spindle rotatably supported from said column, a knee supported from said column and guided thereon for vertical movement, a work table supported from said knee for reciprocatory movement relative thereto in a direction transverse to the spindle axis, a power train for rotating said spindle including a power source associated with said column, transmission mechanism for moving said table including a feed train and a rapid traverse train each driven from said power source, said column providing guide surfaces for said vertical knee movement including surfaces associated with said front wall and spaced apart laterally in the direction of table movement, said table transmission including a plurality of extensible shaft devices each including a vertical shaft element positioned adjacent said front column wall and between said spaced apart guide surfaces, said feed train providing a rate changer including in the order recited a first rate change device associated with said column in fixed bodily relation with said spindle, one of said shaft elements, a second rate change device bodily vertically movable with said knee, and a feed terminal element, said rapid traverse train including the other of said shaft elements and a rapid traverse terminal element, each of said terminal elements being bodily vertically movable with said knee and said table transmission being bodily vertically movable with said knee and selectively connectible with said feed or rapid traverse terminal element to drive said table.

4. In a milling machine, the combination of an upstanding column having a front wall, a tool spindle rotatably supported from said column, a knee supported from said column and guided thereon for vertical movement, a work table supported from said knee for reciprocatory movement relative to said spindle in a direction transverse to the spindle axis, a power train for rotating said spindle including a power source associated with said column, and transmission mechanism for moving said table including a feed train and a rapid traverse train said column providing guide surfaces for said vertical knee movement including surfaces associated with said front wall and spaced apart in the direction of table movement, said table transmission including a plurality of extensible shaft devices each including a vertical shaft element positioned adjacent said front wall and between said spaced apart guide surfaces, said feed train including in the order recited a first rate change device associated with said column in fixed bodily relation to said spindle, one of said shaft elements and a second rate change device bodily vertically movable with said knee, said second rate change device movable with said knee being of large rate change effect relative to the rate change effect of said first device, whereby to avoid slow motion and high torque in the extensible shaft device of said feed train.

5. In a milling machine, the combination of an upstanding column having a front wall, a tool spindle rotatably supported therefrom, a knee supported from said column and guided thereon for vertical movement, a work table supported from said knee for reciprocatory movement relative thereto in a path transverse to the axis of spindle rotation, a spindle drive train including a power source associated with said column, said column providing guide surfaces for said vertical knee movement including a plurality of surfaces associated with said front wall and spaced apart in the direction of table movement, an extensible shaft device including a vertical shaft element adjacent said front column wall and between said spaced apart guide surfaces, a transmission including in the order recited said power source, said shaft element and a driven element and other transmission mechanism including reversing mechanism driven from said driven element and invariably operative for individually reversing the direction of movement of said table in said path exclusive of reversal of other movements.

6. In a milling machine, the combination of an upstanding column, a tool spindle rotatably supported from said column, a work table supported from said column for movement in three mutually transverse paths, a spindle train including a power source, a motion interrupter and a spindle rate changer, transmission mechanism for said work table including a feed train providing a rate changer and driven from said power source exclusive of said spindle rate changer, a rapid traverse train driven from said power source at substantially constant speed and exclusive of said motion interrupter, an overrunning device, each of said trains providing a terminal element forming a portion of said overrunning device, a transmission member connected to be driven from said overrunning device, a clutch in said rapid traverse train and alternatively operable for connecting said member to be driven from said feed or rapid traverse trains through said overrunning clutch, a first branch line driven from said member including a first reverser individually operable for reversing movement of said table in one of said paths, a second reverser, a second branch line drive from said member through said second reverser and having branch portions respectively selective of different of the other paths of table movement, said first branch line providing means for movement in the path of table movement controlled from said first reverser at a rate substantially greater than in another of said paths.

7. In a milling machine, the combination of an upstanding column, a tool spindle rotatably supported from said column, a work table supported from said column and adapted for movement in a plurality of mutually transverse paths, a power train for rotating said spindle including a power source associated with said column and a spindle rate changer, transmission means for moving said table including a feed rate changer driven from said power source to exclude said spindle rate changer, said feed rate changer including a first rate change device associated with said column and in bodily fixed relation with said spindle, and a second rate change device bodily movable with said table in one of said paths, said rate change devices being connected by an extensible coupling device whereby to be relatively bodily movable while maintaining a driving connection therebetween, said rate change device movable with said table being of relatively large rate change effect whereby to avoid slow motion and high torque in said extensible coupling device, and control means for said rate changers including a member movable with said table in one of said paths and having motion transmitting connection with each of said rate changers.

JOSEPH B. ARMITAGE.